A. JOHNSON.
VEHICLE.
APPLICATION FILED DEC. 11, 1916.
1,242,446.
Patented Oct. 9, 1917.
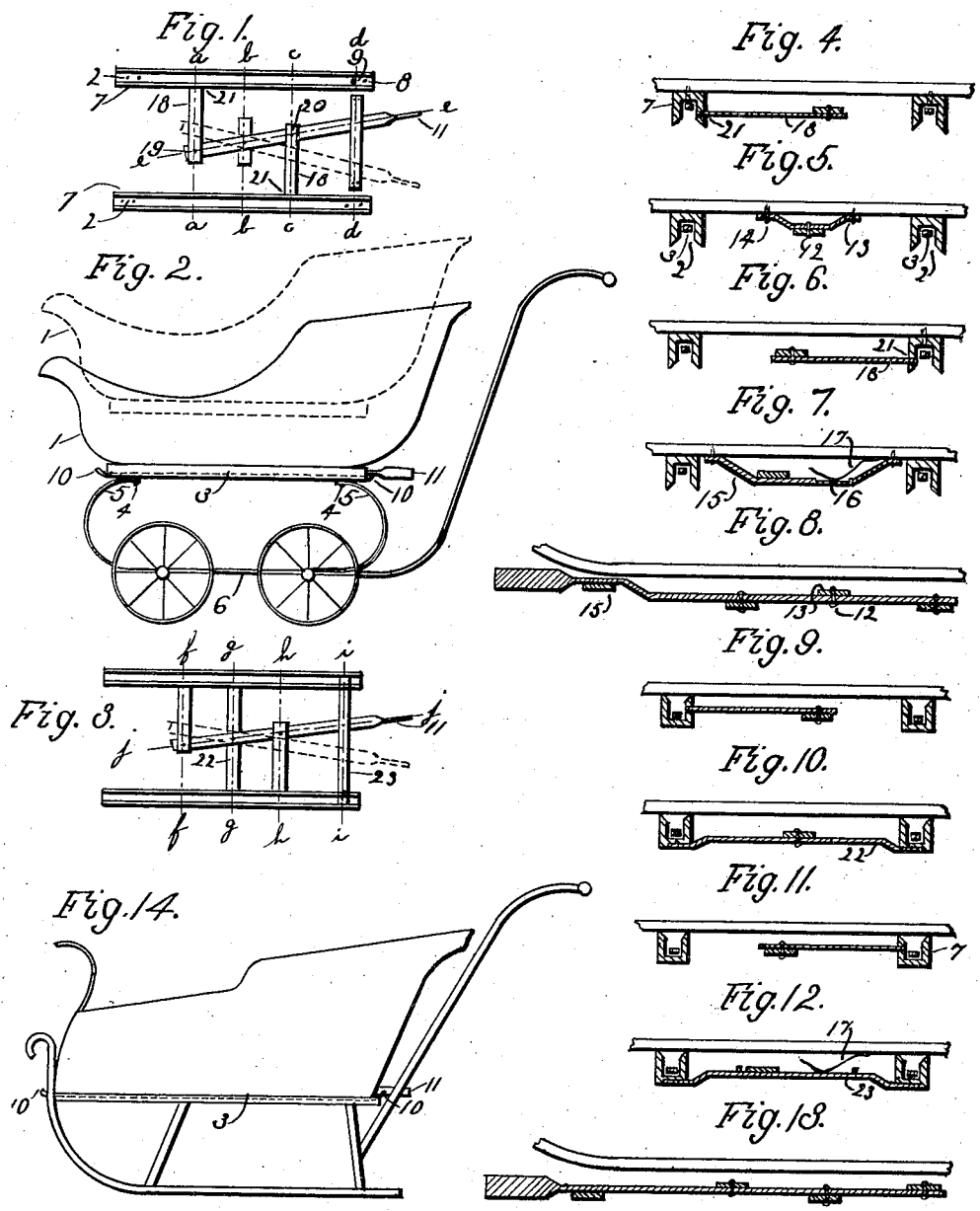

UNITED STATES PATENT OFFICE.

ALDOR JOHNSON, OF DULUTH, MINNESOTA, ASSIGNOR OF ONE-HALF TO GUNNAR JOHNSON, OF DULUTH, MINNESOTA.

VEHICLE.

1,242,446.  Specification of Letters Patent.  Patented Oct. 9, 1917.

Application filed December 11, 1916. Serial No. 136,381.

*To all whom it may concern:*

Be it known that I, ALDOR JOHNSON, a subject of Sweden, Europe, residing at Duluth, in the county of St. Louis and State of Minnesota, have invented certain new and useful Improvements in Vehicles, of which the following is a specification.

The object of my invention is to provide a vehicle the box or body of which may be locked, unlocked, reversed, or removed, with reference to the running-gear or truck, with greater ease and convenience than any other heretofore invented, and also to provide an extremely simple and highly efficient interlocking device for vehicles.

I obtain these objects by means of grooves on the under side or lower portion of the body of the vehicle which grooves are adapted to receive rods secured to the truck, and by means of a certain inter-locking device, all of which are shown by the accompanying drawings.

Figure 1 is a plan view of my improved vehicle as it appears inverted, with the longitudinal truck-rods removed. Fig. 2 is a view in elevation showing the box or body on the truck of a carriage, the dotted lines showing the body as it appears when lifted directly upward from the truck. Fig. 3 is a plan view of the main part of my improvement when adapted to be fastened to the truck or running-gear instead of to the underside of the body of the vehicle. Fig. 4 is a view in cross section taken on the line *a a* Fig. 1, but also showing the truck-rods in cross section. Fig. 5 is a similar view taken on the line *b b* of Fig. 1. Fig. 6 is a similar view taken on the line *c c* of Fig. 1. Fig. 7 is a similar view taken on the line *d d* of Fig. 1. Fig. 8 is a view in cross-section taken on the line *e e* of Fig. 1. Fig. 9 is a view in cross-section taken on the line *f f* of Fig. 3, but also showing cross section of rods in the grooves. Fig. 10 is a similar view taken on the line *g g* of Fig. 3. Fig. 11 is a similar view taken on the line *h h* of Fig. 3. Fig. 12 is a similar view taken on the line *i i* of Fig. 3. Fig. 13 is a view in cross-section taken on the line *j j* of Fig. 3. Fig. 14 is a view in elevation of my invention when applied to a sled.

Referring to Fig. 1, the body 1, of the vehicle is provided with grooves 2, preferably extending longitudinally, that is, lengthwise of the body, one on each side of its underside, which grooves are adapted to longitudinally receive the rods 3, (Figs. 2 and 14) serving as ribs or tongues for said grooves, and rigidly secured by screws 4, or other suitable means, preferably, but not necessarily, to the springs 5, (Fig. 2) of the truck 6. These grooves may be formed either in the bottom of the body itself or in bars 7, rigidly secured to the underside of the body, by means of screws or bolts 8 passing through the holes 9, (Fig. 1) in said bars, or they may be formed by likewise fastening to said underside of the body parallel strips of wood or metal, spaced so as to form grooves. Likewise, the rods 3 may be either round or flat in cross-section, or they may be flat and provided with a longitudinal rib to engage said grooves, in which case holes may be provided in the rib to receive the lock-rods hereinafter described. At present I prefer the use of the longitudinally grooved bars 7, preferably made of iron or steel, and plain round or flat rods. The rods 3, (Fig. 2) are bent slightly upward at the ends 10, to prevent the body from moving out of position, forward or backward, and to afford guides for the body when being placed in position on the truck.

For locking the body of the vehicle in position with respect to the truck, I use the lever 11, preferably placed so that its free end will project from the rear of the vehicle, and pivotally connected by the pin 12 to the plate 13, (see Fig. 5) which is fastened by the screws 14, or by other suitable means, to the underside of the body, and this lever rests with its free end on the cross-rod 15, (Fig. 7) provided with the notch 16, and the spring 17, to hold it in position when the truck and body are interlocked. If preferred, I may connect this lever directly to the underside of the body instead of to the plate 13. So-called lockrods 18, (Figs. 1, 4 and 6) are pivotally connected to said lever at 19 and 20, and extend to the holes 21, in the bars 7. When the lever 11, is operated sidewise from the position shown at Fig. 1, it will cause the lock-rods 18, to move end-wise and outwardly, and their free ends will pass through the holes 21, and under, and at right angles with, the truck rods 3, and the outer end portions of said lock-rods will then hold said truck-rods in position in the grooves 2. Instead of having the ends of the lock-rods pass under the truck-rods, I may, if desired, provide holes in the truck-rods opposite the ends of the lock-rods 18, into which these latter may pass when the lever is operated as just stated. The body may be released from the truck by merely operating the lever 11, back to the position shown in Fig. 1.

If desired, the groove bars 7, may be attached to the truck and the underside of the body may be ribbed or rodded, and the lever may then be attached to the cross-rod 22, as in Fig. 3, instead of to the body, and be made to rest with its free end on the cross-rod 23, both of the cross-rods being then fastened at each end to said bars 7.

When this invention is applied to a baby carriage a number of advantages will readily suggest themselves. For example, the same body may be used both for a sled and for a carriage, and transferred from one to the other at will. Likewise, the body being detachable, it may be taken off the truck or sled and hung up by any suitable means, and used as a swing or cradle. The body may also be reversed with reference to the truck so that its front will be at the rear of the truck or vice versa. When it is desired to wash or clean the truck, the body may be removed so as to prevent its being soiled. And again, where the wheels and truck of the carriage have become soiled from use upon the street or road, or, if for any reason it is not desired to move the whole carriage into one's house, the truck may be left outside and only the body brought in, without even removing the clothes or child therefrom. My said improvements may be attached to any carriage with very little expense or effort, and is exceedingly simple and at the same time highly convenient.

I claim:

1. In a baby carriage the combination of a detachable body, longitudinally grooved bars rigidly secured on each side of the under side of said body, perforations in the flanges of said bars, rods rigidly secured to the truck of said baby carriage to longitudinally engage the grooves of said bars, a lever pivotally connected to the underside of said body and positioned longitudinally between said bars, and lock-rods pivotally connected to said lever on opposite sides of its pivotal connection with said body and operative in said perforations transversely of said bars and underneath and at right angles with said longitudinally extending rods, to lock and unlock said longitudinally extending rods in said grooves, and means for holding said body against longitudinal movement, substantially as described.

2. An interlocking device for vehicles comprising longitudinally grooved bars adapted to be rigidly secured to the underside of the body of a vehicle longitudinally thereof, perforations in the flanges of said bars, rods adapted to be rigidly secured to the truck of the vehicle longitudinally thereof, and to longitudinally engage the grooves of said bars, a lever adapted to be pivotally connected to the underside of said body longitudinally between said bars, lock-rods pivotally connected to said lever on opposite sides of the point of its intended pivotal connection with said body, and adapted to extend horizontally in opposite directions from, and approximately at right angles with, said lever, and to operate in said perforations and grooves approximately at right angles with said longitudinally extending rods and bars, means for holding the free end portion of said lever in position, and means for guiding said body into position on said truck, and for holding it against longitudinal movement, substantially as described.

ALDOR JOHNSON.

Copies of this patent may be obtained for five cents each, by addressing the "Commissioner of Patents, Washington, D. C."